(12) United States Patent
Gao et al.

(10) Patent No.: US 9,357,528 B2
(45) Date of Patent: May 31, 2016

(54) WIRELESS COMMUNICATIONS BASED ON IDENTIFYING LOWER POWER NODES IN HETEROGENEOUS NETWORK DEPLOYMENTS

(71) Applicant: ZTE Wistron Telecom AB, Stockholm (SE)

(72) Inventors: Yonghong Gao, Stockholm (SE); Aijun Cao, Stockholm (SE); Jan Johansson, Norrfjärden (SE); Patrick Svedman, Stockholm (SE); Thorsten Schier, Stockholm (SE); Bojidar Hadjiski, Stockholm (SE)

(73) Assignee: ZTE Wistron Telecom AB, Stockholm (SE)

( * ) Notice: Subject to any disclaimer, the term of this patent is extended or adjusted under 35 U.S.C. 154(b) by 224 days.

(21) Appl. No.: 14/040,573

(22) Filed: Sep. 27, 2013

(65) Prior Publication Data
US 2014/0092861 A1 Apr. 3, 2014

(30) Foreign Application Priority Data
Sep. 28, 2012 (WO) ................. PCT/CN2012/082334

(51) Int. Cl.
*H04W 72/04* (2009.01)
*H04W 48/08* (2009.01)
*H04L 27/26* (2006.01)
(Continued)

(52) U.S. Cl.
CPC .............. *H04W 72/04* (2013.01); *H04L 5/0048* (2013.01); *H04L 27/2613* (2013.01); *H04L 27/2655* (2013.01); *H04L 27/2675* (2013.01); *H04W 48/08* (2013.01); *H04W 56/00* (2013.01); *Y02B 60/50* (2013.01)

(58) Field of Classification Search
USPC .................................................. 370/330, 331
See application file for complete search history.

(56) References Cited

U.S. PATENT DOCUMENTS

2001/0024430 A1* 9/2001 Sekine et al. ................. 370/331
2007/0254626 A1* 11/2007 Ahlgren ..................... 455/404.2
(Continued)

OTHER PUBLICATIONS

3GPP Technical Specification, "3rd Generation Partnership Project; Technical Specification Group Radio Access Network; Evolved Universal Terrestrial Radio Access (E-UTRA); Multiplexing and channel coding (Release 10)," TS 36.212 v 10.6.0, 79 pages, Jun. 2012.
(Continued)

*Primary Examiner* — Man Phan
*Assistant Examiner* — Pamit Kaur
(74) *Attorney, Agent, or Firm* — Perkins Coie LLP

(57) ABSTRACT

In a heterogeneous network deployment that includes one or more macro base stations and one or more low power nodes, a technique can be provided to encode network operational information using phase differences in synchronization signals transmitted by a network node. The synchronization signals may be one of the first signals that a user equipment (UE) attempts to locate when attempting to join a wireless network. The phase-encoded network operational information indicates to the UE where to locate a geometry indicator transmission from a low power node that is a part of the network, but is not the node that transmits the synchronization signals. The geometry indicator transmission may include identity information for the transmitting node and may be transmitted at a pre-determined nominal transmit power.

30 Claims, 8 Drawing Sheets

(51) Int. Cl.
*H04L 5/00* (2006.01)
*H04W 56/00* (2009.01)

(56) References Cited

U.S. PATENT DOCUMENTS

2010/0008346 A1* 1/2010 Shirakata et al. ............ 370/343

2014/0064211 A1 3/2014 Cao et al.

OTHER PUBLICATIONS

3GPP Technical Specification, "3rd Generation Partnership Project; Technical Specification Group Radio Access Network; Evolved Universal Terrestrial Radio Access (E-UTRA); Physical Channels and Modulation (Release 10)," TS 36.211 v 10.5.0, 101 pages, Jun. 2012.

* cited by examiner

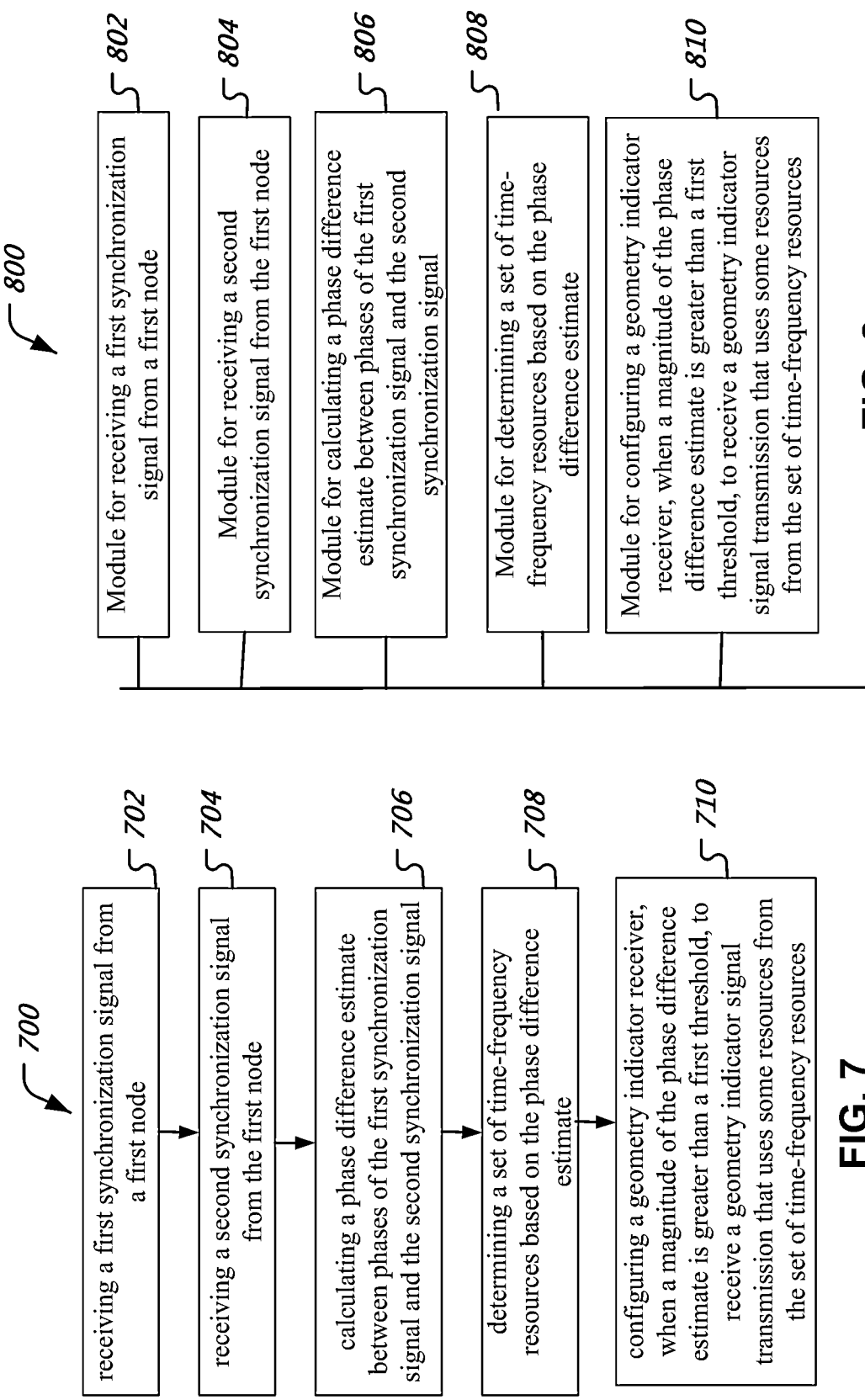

WIRELESS COMMUNICATIONS BASED ON IDENTIFYING LOWER POWER NODES IN HETEROGENEOUS NETWORK DEPLOYMENTS

CROSS REFERENCE TO RELATED APPLICATIONS

This document claims the right of priority under 35 U.S.C. §119(a) and the Paris Convention of International Patent Application No. PCT/CN2012/082334, filed on Sep. 28, 2012. The entire content of the before-mentioned patent application is incorporated by reference herein.

BACKGROUND

This document relates to cellular telecommunication systems, including heterogeneous networks where one or more low-power nodes are deployed at least partially within the coverage area of a macro base station.

Cellular communication systems are being deployed all over the world to provide voice services, mobile broadband data services and multimedia services. There is a growing need for cellular bandwidth due to various factors, including the continuous increase in the number of mobile phones such as smartphones that are coming on line and deployment of new mobile applications that consume large amounts of data, e.g., mobile applications in connection with video and graphics. As mobile system operators add new mobile devices to the network, deploy new mobile applications and increase the geographic areas covered by broadband mobile services, there is an ongoing need to cover the operator's coverage area with high bandwidth connectivity.

SUMMARY

The cellular bandwidth in a given coverage area can be increased by a number of techniques, including improving the spectrum efficiency for the point-to-point link and splitting communication cells into smaller cells. In cell splitting, when the split cells become small and close to one another, the adjacent cell interferences can become significant and may lead to the cell splitting gain saturation as the number of split cells in a given area increases to above a certain number. Furthermore, nowadays it is increasingly difficult to acquire new sites to install base stations and the costs for adding new base stations are increasing. These and other factors render it difficult to use cell-splitting to fulfill the increasing bandwidth demands.

This document describes technologies, among other things, for enabling improved co-existence of low power nodes and macro base stations in a heterogeneous network deployment. The described technologies can be implemented in ways that improve the available bandwidth in a given heterogeneous network.

In one aspect, methods, systems and apparatus are disclosed for receiving a first and a second synchronization signals, calculating a phase difference estimate between phases of the synchronization signals, determining a set of time-frequency resources based on the phase difference estimate and configuring a geometry indicator receiver to receive a geometry indicator signal transmission that uses resources from the set of time-frequency resources.

In another aspect, methods, systems and apparatus are disclosed for transmitting, from a first node, a first synchronization signal using a first set of transmission resources and transmitting, from the first node, a second synchronization signal using a second set of transmission resource, such that a phase difference between the first synchronization signal and the second synchronization signal is indicative of a third set of transmission resources for use by a second node for transmitting a geometry indicator signal.

These and other aspects, and their implementations and variations are set forth in the drawings, the description and the claims.

BRIEF DESCRIPTION OF THE DRAWINGS

FIG. 7 is a flow chart representation of a process of wireless communications.

FIG. 8 is a block diagram representation of a wireless network apparatus.

Like reference symbols in the various drawings indicate like elements.

DETAILED DESCRIPTION

Figure 1:
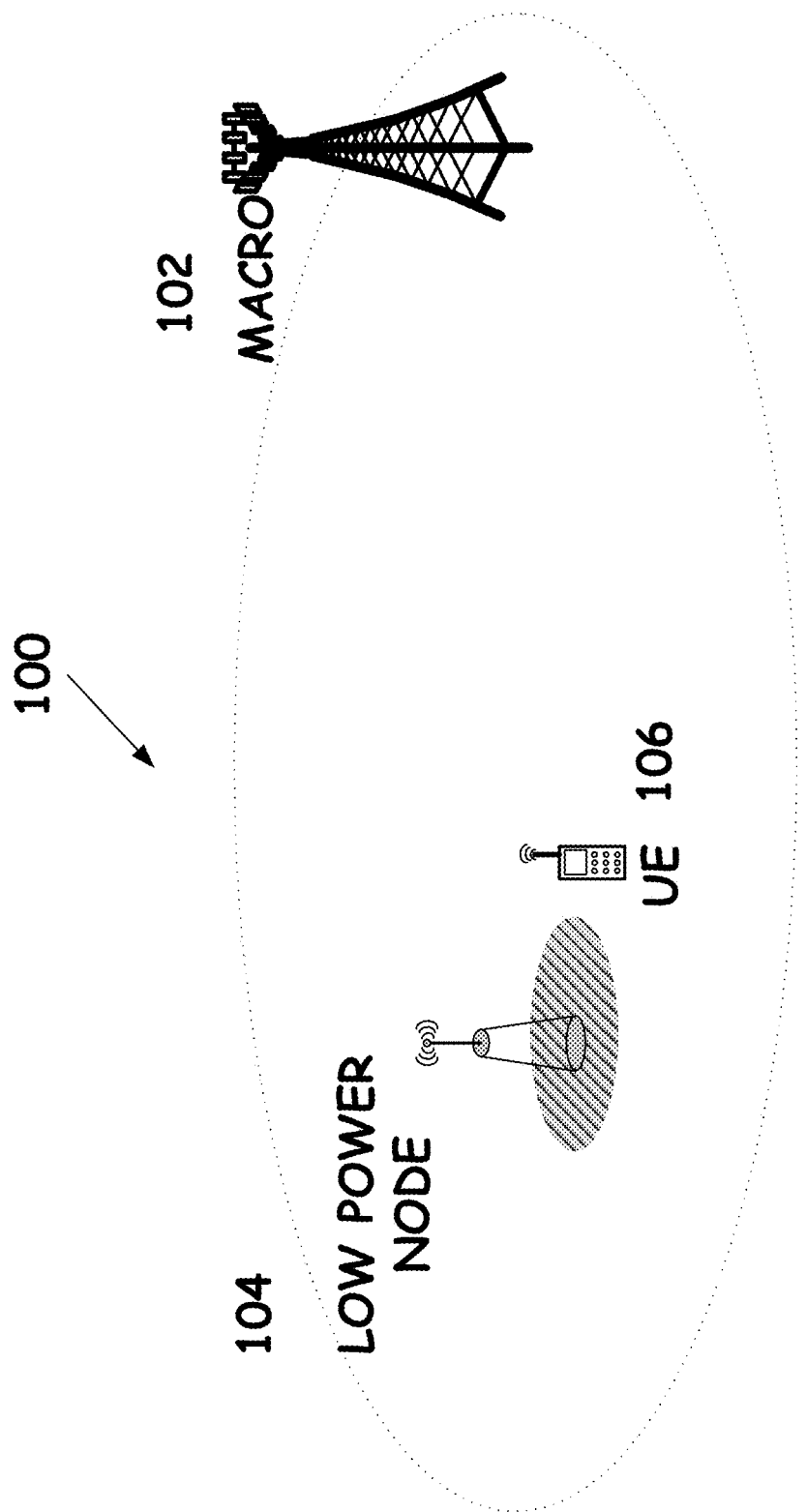
FIG. 1 depicts a wireless HetNet deployment scenario.

The techniques described in this document are applicable to a wireless network serving one or more user equipment (UE) devices, such as a mobile phone or a wireless communication device including a tablet or laptop computer. The wireless network can be a heterogeneous network (HetNet) deployment having multiple tiers of communication nodes/base stations such as macro base stations and micro base stations. A macro base station in such a HetNet has sufficiently high transmission power to cover a large macro cell area while a micro base station is a low power node (LPN) that covers a smaller area within the larger macro cell area.

The techniques disclosed in this document, in one aspect, can be used to encode network operational information using phase differences in synchronization signals transmitted by a network node. The synchronization signals may be one of the first signals that a user equipment (UE) attempts to locate when attempting to join a wireless network. The phase-encoded network operational information indicates to the UE where to locate a geometry indicator transmission from a low power node that is a part of the network, but is not the node that transmits the synchronization signals. The geometry indicator transmission may include identity information for the transmitting node and may be transmitted at a pre-determined nominal transmit power. In one advantageous aspect, the disclosed techniques therefore enable a UE newly entering a wireless network, which does not have information about topology of the wireless network or whether low power base stations are present in the network or not, to quickly locate information about any low power nodes and optionally adjust its uplink transmission power and/or network admission process accordingly.

In another aspect, the disclosed techniques are useful to facilitate controlling power of signal transmission from a user equipment (UE) in a HetNet. the uplink power transmitted by the UE is controlled by transmitting in the downlink direction information that allows the UE to estimate geometry of deployment, e.g., how close a low power node is to the UE in comparison to a nearby macro cell base station, so that the UE can set the proper uplink power to be sufficient for establishing a reliable communication with the serving base station. This uplink power control by UE in establishing communication with a serving base station, in one aspect, can be used to reduce interference from the UE to other nearby LPNs or UEs, thereby achieving higher data throughput for a HetNet deployment.

In some implementations, a macrocell base station can be used to transmit two different types of synchronization signals, e.g., primary synchronization signal (PSS) and secondary synchronization signal (SSS), for UEs to identify the presence of a wireless cell and identify basic operational details of the cell, respectively. These synchronization signals may use pre-defined signal structure and time-frequency resources to allow a UE to quickly locate the synchronization signals without any user intervention. The disclosed techniques can be implemented to encode information in such synchronization signals to enable UEs to locate, in the time-frequency plane of transmission resources, time slots and subcarriers on which the geometry signals are transmitted from among various possibilities.

As previously discussed, encoding geometry information that can be located right after receiving synchronization signals and before layer 3 or upper layer communication is established with the serving base station, in one aspect, allows the network to control the uplink transmission power used by the UE for subsequent network admission process. Without the knowledge of the geometry information, the UE may tend to use maximum power for uplink transmission during the network admission stage. This maximum power operation of UE may inadvertently disrupt communication for other UEs and low power nodes that are near the UE because the UE is unaware of these nodes during the admission process.

A Heterogeneous Network or HetNet includes a tier of macro base stations forming a macro base station coverage and at least another tier of multiple low-power nodes (LPNs), or micro base stations. The coverage by the LPN network tier is added onto the existing macro base stations coverage area to improve the cellular coverage and the bandwidth available at each covered UE location. In some configurations, the macro base station works as a master and the low power nodes work as slaves (e.g., follow transmission schedule controlled by the master) in order to achieve certain advantages, e.g., better interference managements and resource allocation.

FIG. 1 shows one example of a HetNet deployment 100 that includes a macro base station 102, one or more low power nodes 104 for serving one or more UEs 106 in the covered area. If a UE 106 is close to one low power node 104, its uplink transmit power may be unnecessarily high before the UE 106 establishes a connection with the network. Although this high uplink transmit power from the UE 106 may be reduced upon establishing the connection with the network since the process of establishing the network connect may require the UE 106 to lower its transmit power by the uplink power control loop. This high transmit power by UE 106 may cause some undesired effects. For example, the high transmit power by UE 106 may generate significant uplink co-channel interferences which can cause certain detriments to the uplink capacity. For another example, this unnecessary high transmit power by the UE 106 may reduce the performance of or even saturate the receive chain completely at the particular low power node to which the UE 106 is close and with which the UE 106 is establishing a network connection.

In one situation, where a UE 106 is close to one low power node, if the macro station scheduler could be aware of the UE's approach to the low power node, then the scheduler can assign the low power node to serve the UE 106 as soon as possible. In this way, the required transmit power for the downlink to the UE 106 can be lowered significantly by switching from a relatively high transmit power in the downlink from the initial serving macro station to the UE 106 to a relatively low transmit power in the downlink from the lower power node assigned by the macro station scheduler. Power saving is similarly achieved for the uplink of the UE 106, which is switched from a relatively high transmit power in the original uplink from the UE 106 to the initial serving macro station to a relatively low transmit power in the new uplink from the UE 106 to the lower power node assigned by the macro station scheduler. The UE 106 transmit power can be lowered significantly by switching from the initial serving macro base station to the assigned lower power node. Consequently, both downlink and uplink interference generated by this UE 106 to other UEs 106 in the network, which use the same frequency resources at the same time, can be reduced and this reduction improves the overall system performance.

The awareness of UE's approach to a low power node may be based on the UE detecting or identifying the low power node's local ID and reporting the detected ID to the macro base station afterwards. When a UE 106 is entering a new macro base station's coverage area for the first time, e.g., by roaming or by a power-on, the UE 106 has no way of knowing the presence of other UEs 106 or low power nodes until the UE 106 completes network admission process and begins to receive data and control messages from the macro base station. One reason being that low power nodes generally do not transmit synchronization signals that a new UE 106 typically searches for to detect a wireless network.

In various wireless networks, such as Long Term Evolution (LTE) and WiMAX, synchronization signals are transmitted by the network, e.g., by macro cell base station, for the benefit of user equipment or UE. To assist a UE 106 to identify and join a network, a synchronization signal, called primary synchronization signal (PSS), is transmitted to the UE 106 by the network. A UE can receive the PSS and extract information such as slot timing properties and identity the physical layer. Often, a second synchronization signal, called secondary synchronization signal (SSS), is transmitted by the network to the UE 106 to allow the UE 106 to extract additional information such as identification of the cell, structure of transmission frame and whether time domain multiplexing (TDM) or frequency domain multiplexing (FDM) is used in the cell. Various existing wireless standards and HetNet deployments do not specify any phase relationship between PSS and SSS and some allow for arbitrary phase relationships between PSS and SSS.

In this document, a technique is disclosed in which the phase difference between the primary synchronization signal (PSS) channel and the secondary synchronization signal (SSS) channel is used as an indication to the UE 106 about whether or not the UE 106 can receive a special physical signal located at a predefined resource element (RE) set, e.g., time-frequency resources in orthogonal frequency domain multiplexing (OFDM) whose transmissions use time slots. In the examples provided below, the special physical signal can be a "geometry indicator" as further described below and is only transmitted to a UE 106 by the low power node but not by the macro base station.

In examples provided below, PSS and SSS phases can be used interchangeably and phase differences between other reference signals may also be utilized to signal geometry factor of RE locations as described below.

In operation, a low power node (LPN) transmits its geometry indicator signal to its coverage area or microcell. Different LPNs transmit their own respective geometry indicator signals. A UE 106 within the coverage area of the LPN receives the LPN's geometry indicator signal. In addition, the macro base station that covers the LPN area transmits PSS and SSS signals to the UE 106. The UE 106 detects the phase difference between the received PSS and SSS and the UE 106 demodulates and decodes the received geometry indicator signals located at the predefined resource elements. Each geometry indicator signal received by the UE 106 includes information about unique identity of a low power node that transmits the received geometry indicator signal. The received geometry indicator signal also may provide additional information to the UE 106 about how far the transmitting low power node is from the UE 106. In some embodiments, based on the detected phase difference (e.g., whether the value is close to 45, 90, 180 or 225 degrees), the UE searches the most likely low power node ID within a pre-defined ID set.

In some implementations, in order to save the UE battery life, if no phase difference is detected between PSS and SSS, the UE could stop the demodulation and decoding of the received geometry indicator signals located at the predefined resource elements. After the low power node ID is identified based on the received geometry indicator signal, the UE reports the ID to the macro base station after the UE establishes the connection to the network.

Example embodiments using Long Term Evolution (LTE) deployment scenarios are discussed in the specific examples below, but the application of the disclosed techniques is not limited to LTE, and can be used in other types of cellular HetNet communication systems. Furthermore, the terms used in this specification are generally consistent with their usage in the currently published versions of 3GPP documents TS 36.211 (version 10.5) and TS 36.212 (version 10.6), the relevant portions of which are incorporated in this document by references.

Figure 2:
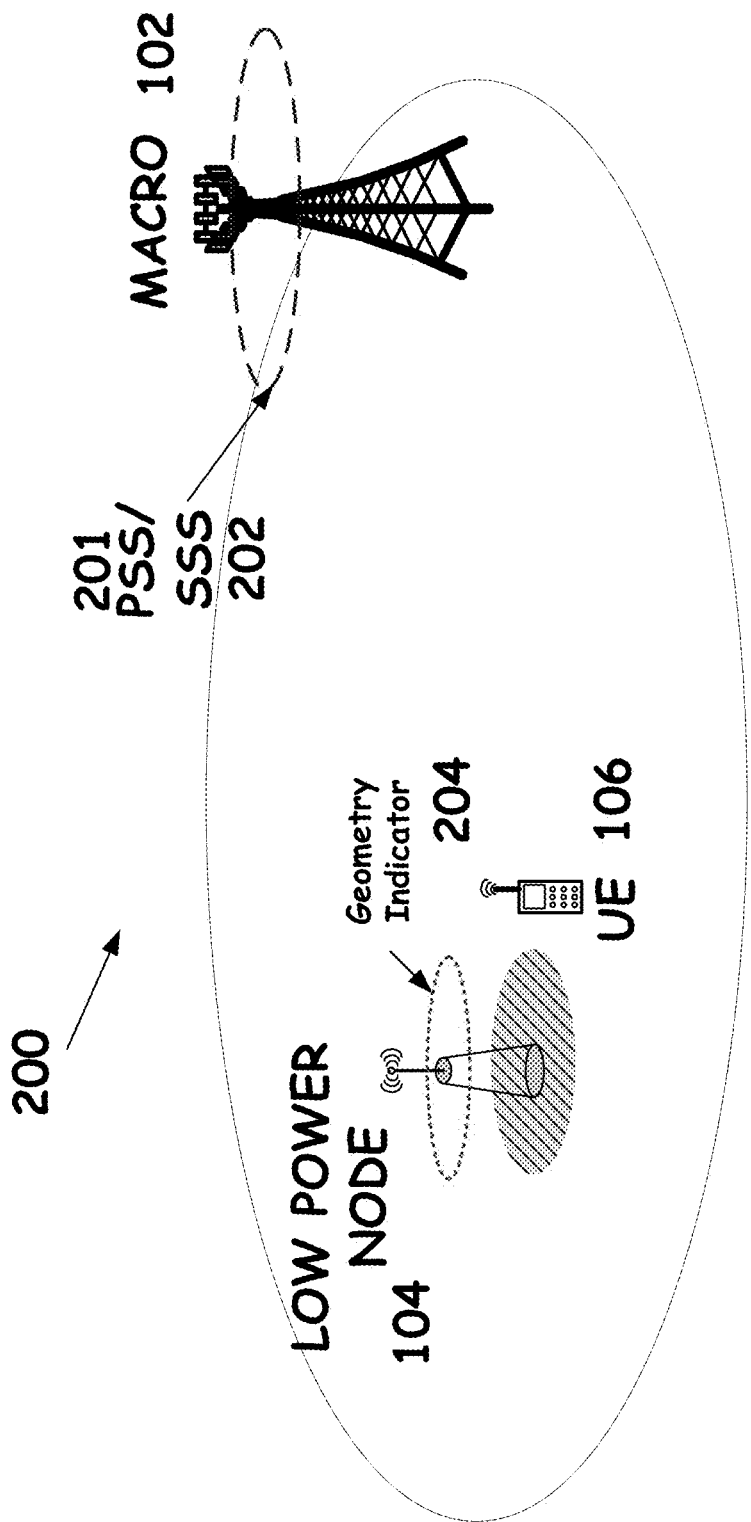
FIG. 2 depicts a wireless HetNet deployment that uses a geometry indicator.

With reference to FIG. 2, the operation of a HetNet 200 that uses a geometry indicator is further discussed.

(1) Primary synchronization signal PSS (201) and secondary synchronization signal SSS (202) are transmitted only by the macro base station 106. A low power nodes 104 is not used to transmit the PSS and SSS signals. For example, in LTE networks, PSS/SSS 201, 202 are located at time slot 0 and slot 10 respectively in one radio frame.

(2) SSS is only transmitted at the macro base station. The low power nodes are not used to transmit SSS signals. The SSS transmitted by the macro base station is located at slot 0 and slot 10, respectively, in one radio frame. Furthermore, a phase difference, as further described below, between SSS and PSS is applied on SSS.

Figure 5:
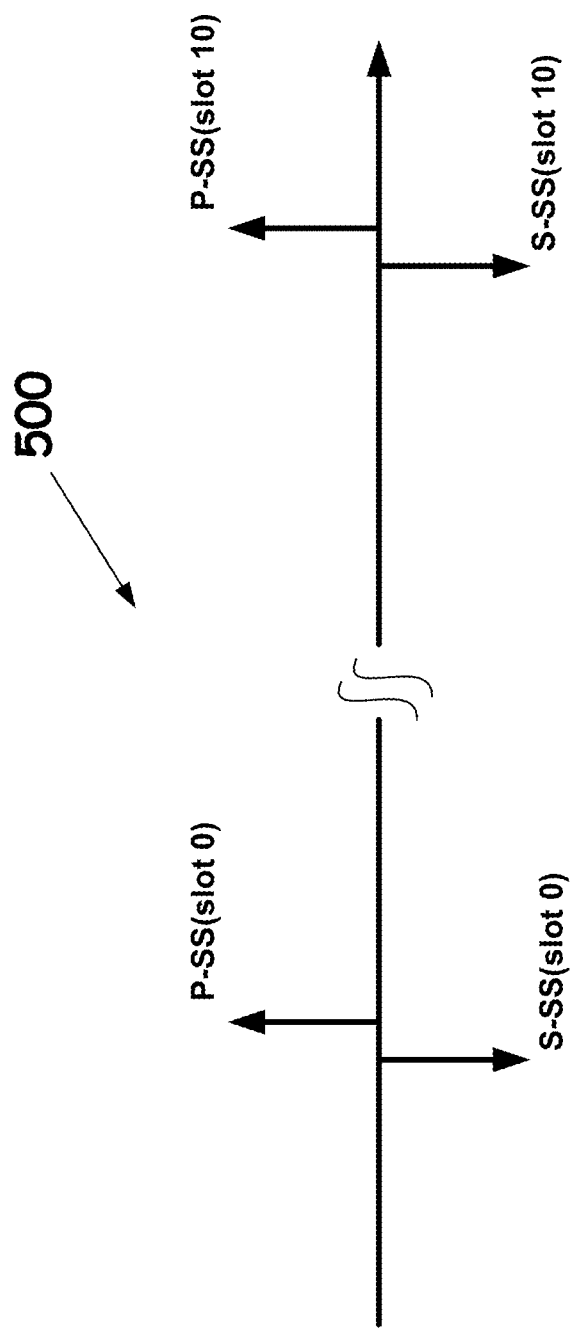
FIG. 5 depicts transmission of primary and secondary synchronization signals having 180 degrees phase difference.

With reference to FIG. 5, in some implementations, the phase difference between SSS and PSS is set to π radians, or 180 degrees. In some implementations, the 180 degrees phase difference would indicate the UE 106 to demodulate and decode the low power node ID carried by some predefined resource elements. In some implementation, a range of phase difference values around 180 degrees may be considered to be 180 degrees. For example, in one implementation, if a phase difference estimate is within 178 to 182 degrees, then it would be considered to be effectively equal to 180 degree difference. Of course, depending on the trade-off between desired sensitivity and probability of false detection, other ranges (e.g., plus/minus 5 degrees) may be used.

Figure 6:
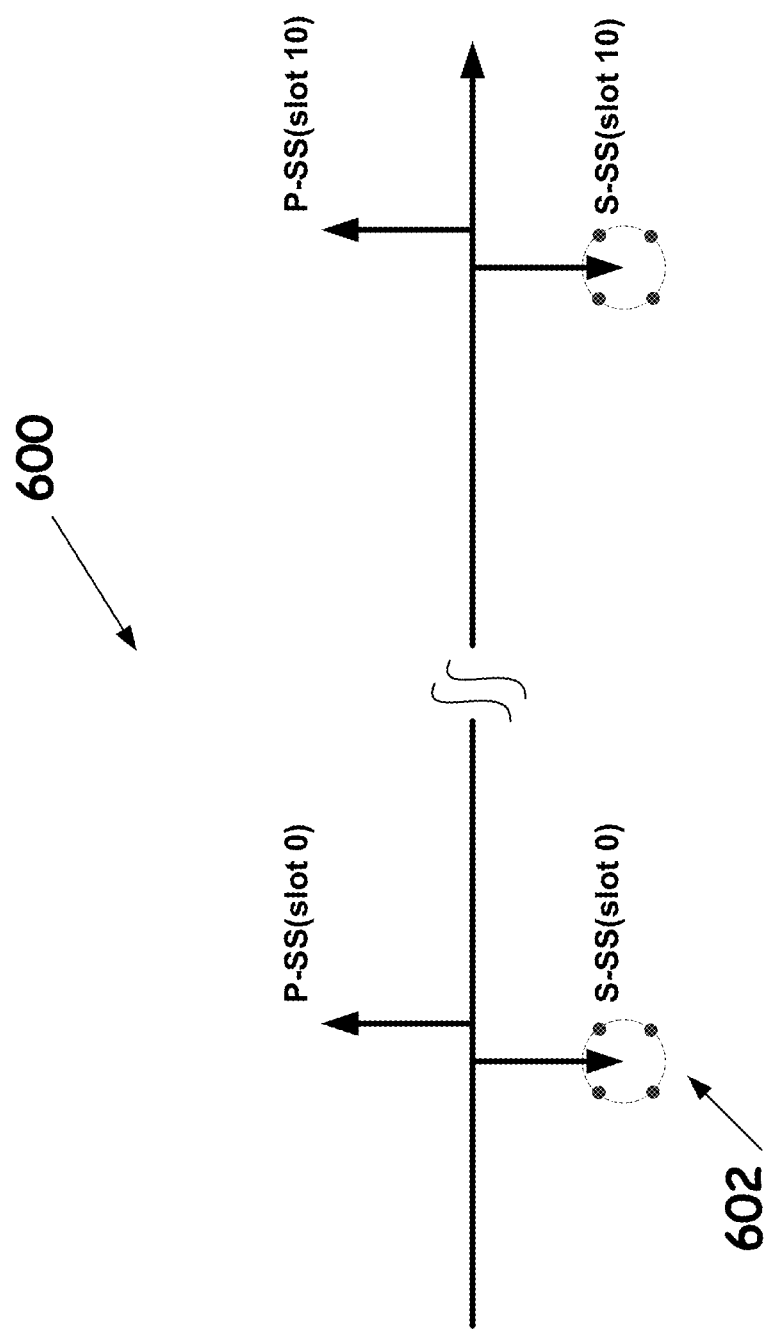
FIG. 6 depicts transmission of primary and secondary synchronization signals having a pre-determined phase difference.

With reference to FIG. 6, the phase difference is chosen among the D positions in the unit circle, e.g., 4 positions, and each position is corresponding a predefined resource element ID set where the UE can search and find the most likely ID number. For example, in some implementations, the UE may maintain a pre-determined set of discrete phase values—e.g., 45, 90, 135 and 180 degrees. The UE may compare the calculate phase estimate and determine the closest phase value from the set. For example, calculated phase value of 50 degrees may be mapped to the closest value 45 degrees, and so on. Other mappings, e.g., equal range partitions, may also be used.

(3) Geometry Indicator 204 is only transmitted by the low power nodes 104:

One embodiment example is as follows:

Sequence a) Only one sequence indicating the geometry indicator for all LPNs 104. And the geometry indicator could be a pre-defined 32-bit sequence. For example, one of the control frame indicator (CFI) sequences can be reused as the geometry indicator, for example, the first CFI sequence:

$$<0,1,1,0,1,1,0,1,1,0,1,1,0,1,1,0,1,1,0,1,1,0,1,1,0,1,1,0,1,1,0,1> \quad \text{Eq (1)}$$

b) There are several predefined sequences and each sequence corresponds to the LPN ID or group ID. For example, all of the CFI sequences can be reused as the geometry indicator.

Time-Frequency Plane Location

In LTE, in one radio frame (10 ms), there are 20 Resource Elements (REs) unused at the same orthogonal frequency domain multiplexing (OFDM) symbols as PSS and SSS 202 located. Therefore 16 REs of them is used for the geometry indicator 204. And in order to have less impact on the synchronization channels, the rest 4 REs are used to separate geometry indicator and the synchronization channels. This arrangement is depicted in FIG. 3.

Figure 3:
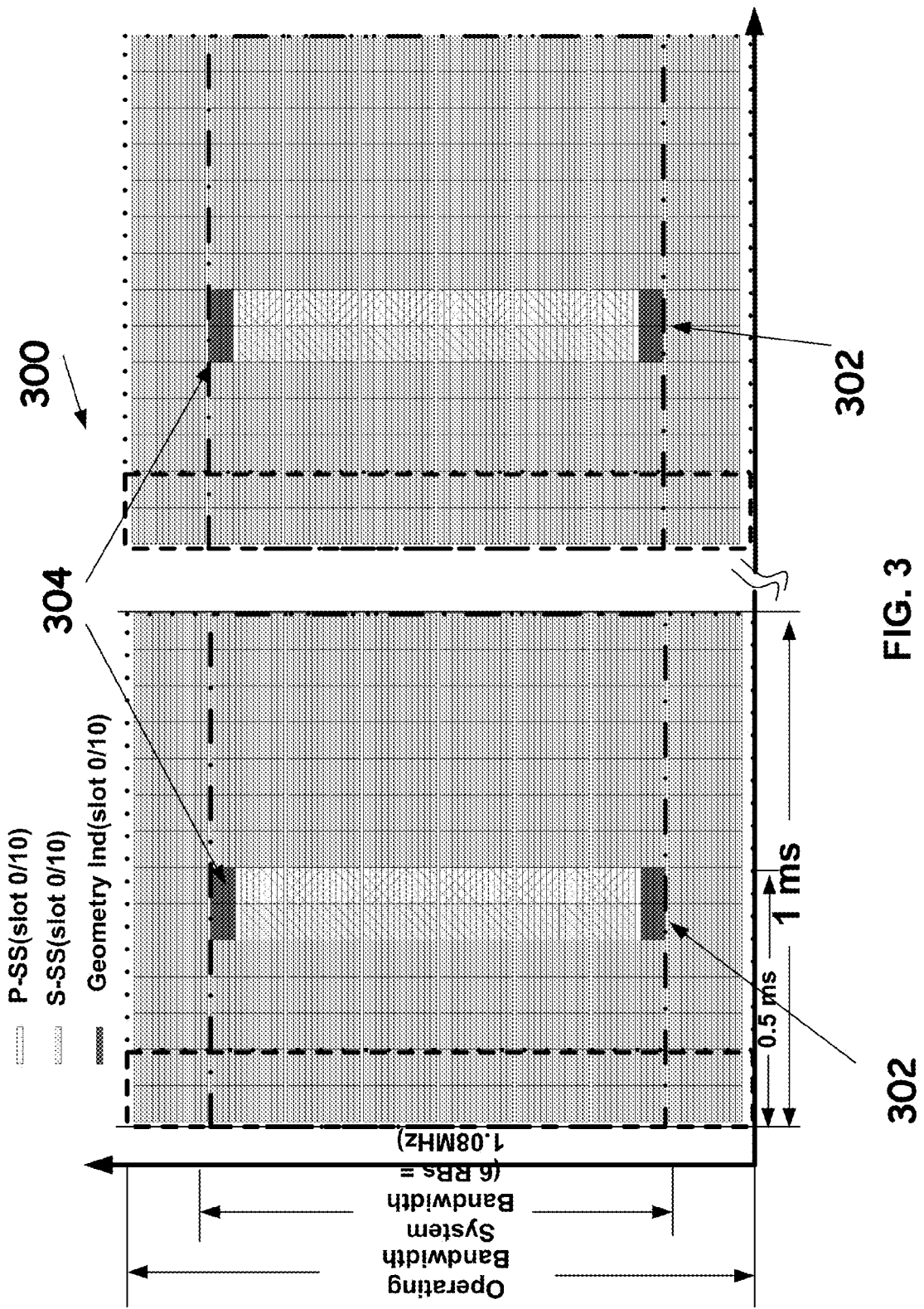
FIG. 3 depicts a transmission resource allocation graph in which certain resource elements (REs) are assigned to transmission of a Geometry Indicator signal.

With reference to FIG. 3, REs are plotted along time axis (horizontal) and frequency axis (vertical) with RE group 302 and 304 showing the unused subcarriers in OFDM symbols used by primary and secondary synchronization signals. The time-frequency plane mapping of transmission resources in the form of REs. Each RE represents a subcarrier of the OFDM signal and a duration of time or a time slot that the signal is transmitted in.

Figure 4:
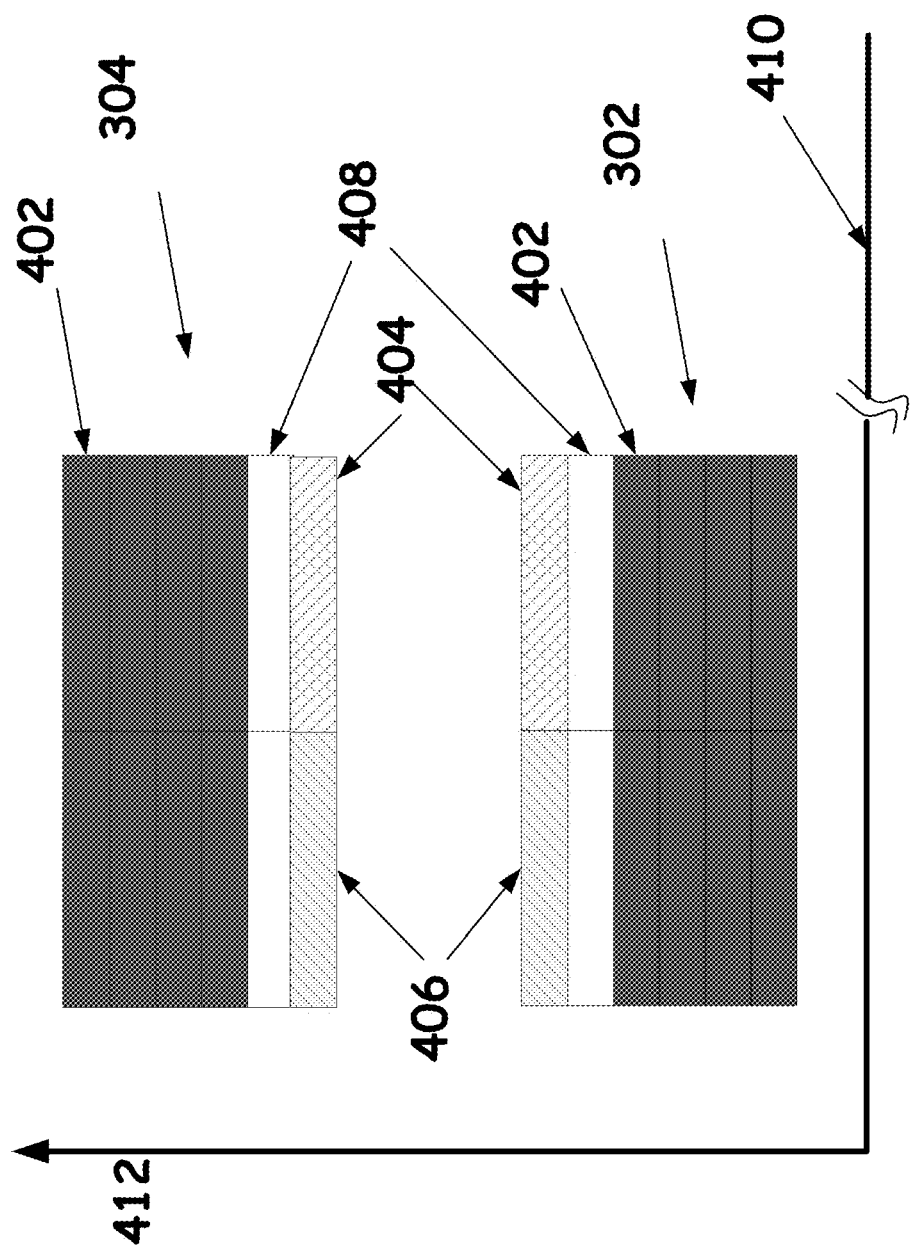
FIG. 4 depicts the allocation of REs to Geometry Indicator signal transmissions.

FIG. 4 shows an enlarged view of RE groups 302 and 304. REs 402 correspond to the REs usable by geometry indicator signals. REs 404 are used by PSS and REs 406 are used by SSS. REs 408 can be optionally used to provide separation between PSS/SSS and geometry signal transmissions. In one beneficial aspect, REs 408 help mitigate any backward compatibility issue with UEs that are expecting no energy transmission in the REs 402.

As can be seen from FIG. 4, when, e.g., a geometry indicator uses two REs out of possible 8 REs 402, several possible assignments of 2 REs from 8 available REs 402 are possible. Therefore, the phase difference based signaling of which two REs are used, in one aspect, avoids the complexity of the UE 106 having to decode all possible combinations of REs. For example, in some implementations, a 45 degree phase difference may indicate that two REs farthest away from the PSS/SSS are used for coding LPN IDs, while a 90 degree phase difference may indicate that 4 farthest REs are used. Other mappings between phase differences and which (and how many) REs from the possible set of REs is used for transmitting geometry indicator are possible.

Modulation

The 32-bit sequence is QPSK modulated to be carried on the 16 REs.

Another embodiment example is:

The geometry factor carries L bits LPN ID. The L-bit LPN ID is at first encoded into M bits, then M bits are modulated into Q symbols, and the Q symbols are finally mapped to Q physical REs whose relative positions to PSS/SSS are fixed and known by UEs. And if those REs are not located in the same OFDM symbols in the time domain as PSS or SSS, then P extra reference symbols are defined and allocated in these Q physical REs to facilitate the UE's demodulation.

(4) UE searches PSS signal as normally (5) When UE finds PSS, and performs SSS detection as normally. Once UE obtains the synchronization to the found cell, UE compares the phase difference between SSS and PSS.

(6) According to the detected phase difference, it detects/decodes the geometry indicator at the same OFDM symbols as the found synchronization channels.

(7) In the embodiment example one, if the detected phase difference is π, then it means that the UE needs to demodulate and decode the geometry factor located at the predefined physical REs.

(8) In the embodiment example two, UE chooses the most likely phase difference among the predefined D values, and finds the corresponding predefined ID set, then demodulates and decodes the received signals which carries the low power node ID, and then finally finds the most likely ID among the predefined ID set.

(9) UE can also report the decoded LPN ID to the network actively, periodically or at the request by the network. For example, the LPN ID can be an auxiliary input to the network for locating the UE.

In some implementations, multiple LPNs may coordinate with each other to form a group that is represented by a group ID. These LPNs may coordinate to transmit an identical geometry indicator signal in the REs 402 using the shared group ID for identification. The power of geometry indicator signal may be adjusted downwards so that the additive effect of transmissions from all LPNs at the UE does not exceed a pre-determined threshold.

In a typical deployment scenario, the LPNs may be deployed to facilitate the operation of a UE in a range between 1 meter to 40 meters. In typical deployment scenarios, based on the path characteristics, UE operation may result in a 20 dB to 6 dB backoff in power from the peak random access preamble transmission power.

FIG. 7 is a flow chart representation of a process 700 for operating a wireless device in a wireless network. At 702, a first synchronization signal is received from a first node. The first node can be, e.g., a macro base station (macrocell base station). The first synchronization signal can be, e.g., PSS (also sometimes abbreviated as P-SS).

At 704, a second synchronization signal is received from the first node. The second synchronization signal can be, e.g., SSS (also sometimes abbreviated as S-SS).

At 706, a phase difference estimate between phases of the first synchronization signal and the second synchronization signal is calculated. The estimation of phases of signals and comparing the phases can be implemented in various ways.

At 708, a set of time-frequency resources is determined based on the phase difference estimate. For example, as previously discussed, 180 degree phase difference may indicate a specific pre-determined set of all possible REs being used for geometry indicator transmission. Similarly, as previously discussed, a number of discrete phase difference values may map to a different subset of REs.

At 710, a geometry indicator receiver is configured, when a magnitude of the phase difference estimate is greater than a first threshold, to receive a geometry indicator signal transmission that uses resources from the set of time-frequency resources. In some embodiments, when the phase difference is below a threshold (e.g., 2 degrees) it is considered to be equivalent to no phase difference for the purpose of determining REs for geometry indicator.

As previously discussed, the geometry indicator signal may include identity of the low power node that transmitted the signal. Using the signal power in the geometry indicator signal, the wireless device may estimate an amount by which to backoff its uplink transmission power during the network admission process. The wireless device may also communicate to the network the identity of the low power node received in the geometry indictor signal. In one aspect, this may allow the network to identify location of the wireless device concurrently with the admission process, thereby guiding the wireless device to operate accordingly in the macrocell or microcell.

FIG. 8 is a block diagram representation of a portion of a wireless communications apparatus. The module 802 is for receiving a first synchronization signal from a first node. The module 804 is for receiving a second synchronization signal from the first node. The module 806 is for calculating a phase difference estimate between phases of the first synchronization signal and the second synchronization signal. The module 808 is for determining a set of time-frequency resources based on the phase difference estimate. The module 810 is for configuring a geometry indicator receiver, when a magnitude of the phase difference estimate is greater than a first threshold, to receive a geometry indicator signal transmission that uses some resources from the set of time-frequency resources. The apparatus 800 and modules 802, 804, 806, 808 and 810 can be further configured to perform one or more techniques described in this document.

Figures 9, 10:
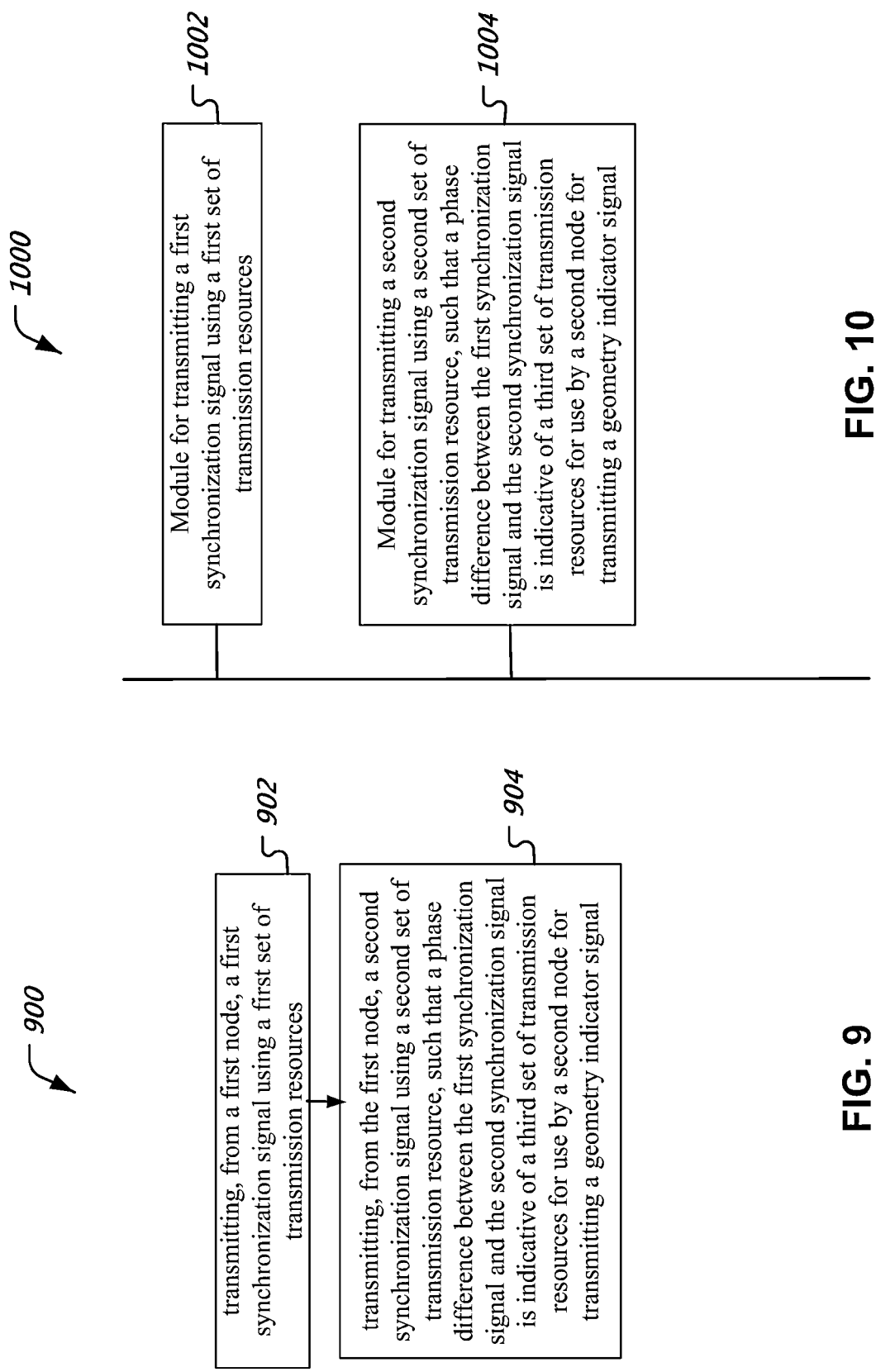
FIG. 9 is a flow chart representation of a process of wireless communications.
FIG. 10 is a block diagram representation of a wireless network apparatus.

FIG. 9 is a flowchart representation of a process 900 of wireless communications. At 902, a first synchronization signal is transmitted using a first set of transmission resources. The first synchronization signal may be, e.g., PSS. The first set of transmission resources may be, e.g., slot 0/10 REs as previously discussed. At 904, a second synchronization signal (e.g., SSS) is transmitted using a second set of transmission resource (e.g., previously discussed slot 0/10 REs for SSS), such that a phase difference between the first synchronization signal and the second synchronization signal is indicative of a third set of transmission resources for use by a second node for transmitting a geometry indicator signal. As previously discussed, in some implementations, the phase difference can only be equal to one of a pre-determined set of values. In some implementations, the geometry indicator signal may include information that uniquely identifies a node that transmits the geometry indicator signal. Various uses and features of the geometry indicator signal have been previously described in this document.

FIG. 10 is a block diagram representation of a portion of a wireless communications apparatus 1000. The module 1002 is for transmitting a first synchronization signal using a first set of transmission resources. The module 1004 is for transmitting a second synchronization signal using a second set of transmission resource, such that a phase difference between the first synchronization signal and the second synchronization signal is indicative of a third set of transmission resources for use by a second node for transmitting a geometry indicator signal. The apparatus 1000 and modules 1002, 1004 may further be configured to implement some of the techniques disclosed in this document.

As previously discussed, a wireless communication system according to the present document includes a macrocell base station, a microcell base station (low powered node) and at least one UE. The macrocell base station can be configured to transmit a primary synchronization signal (PSS) and a secondary synchronization signal (SSS) such that a phase difference between the PSS and the SSS is indicative of location of resource elements used by a geometry indicator in a time-frequency resource plane (e.g., FIG. 4). The microcell base station can be configured to refrain from transmitting PSS and SSS and to transmit the geometry indicator using the resource elements indicated by the macrocell base station. The UE, or the mobile station, can be configured to receive the PSS and the SSS, locate and successfully receive the geometry indicator using the location information indicated by the phase difference, and report an identity of the microcell base station to the macrocell base station.

It will be appreciated that various techniques are disclosed for improved operation of macro and micro (low power) nodes in a heterogeneous network are disclosed.

It will further be appreciated that the disclosed techniques enable reduction in complexity of implementation at a UE or mobile station because REs at which to locate geometry indicator is signaled via phase difference between two synchronization signals received from the macro cell base station.

The disclosed techniques enable operation of a heterogeneous network in which a new wireless device or UE is admitted to the network without the device having to use full uplink power during admission, which may create interference to the operation of other wireless devices or low power nodes nearby.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of operating a wireless device in a wireless network, comprising:
   receiving a first synchronization signal from a first node;
   receiving a second synchronization signal from the first node;
   calculating a phase difference estimate between phases of the first synchronization signal and the second synchronization signal;
   determining a set of time-frequency resources based on the phase difference estimate; and
   configuring a geometry indicator receiver, when a magnitude of the phase difference estimate is greater than a first threshold, to receive a geometry indicator signal transmission that uses resources from the set of time-frequency resources.

2. The method of claim 1, wherein:
   the first node comprises a macro-area node,
   the first signal comprises a primary synchronization signal, and
   the second signal comprises a secondary synchronization signal.

3. The method of claim 2, wherein the primary and secondary synchronization signals use time-frequency resources that are different from the set of time-frequency resources.

4. The method of claim 3, wherein the set of time-frequency resources fit within the same orthogonal frequency domain multiplexing (OFDM) symbols as time-frequency resources used by the primary synchronization signal and the secondary synchronization signal.

5. The method of claim 1, further comprising:
   transmitting to the first node, when a geometry indicator signal is successful received in the set of time-frequency resources, a report comprising an identity of a second node that transmitted the geometry indicator signal.

6. The method of claim 5, wherein:
   the second node includes a micro cell node.

7. The method of claim 1, wherein:
   a nominal transmission power of the geometry indicator signal is less than nominal transmission powers of the first and the second synchronization signals.

8. The method of claim 1, wherein the determining the set of time-frequency resources based on the phase difference estimate comprises checking whether the phase difference estimate is within a second threshold of 180 degrees.

9. The method of claim 1, wherein the determining the set of time-frequency resources based on the phase difference estimate comprises determining, from a list of phase difference values, a candidate phase difference value that is closest to the phase difference estimate.

10. The method of claim 1, further comprising,
    powering down the geometry indicator receiver, when the magnitude of the phase difference estimate is equal to or less than the first threshold.

11. A wireless device operable in a heterogeneous wireless network that includes a macrocell base station and a microcell base station, comprising:
    a first synchronization signal receiver that receives a first synchronization signal;
    a second synchronization signal receiver that receives a second synchronization signal from the macrocell base station;
    a phase difference estimator that calculates a phase difference estimate between phases of the first synchronization signal and the second synchronization signal;
    a resource determiner that determines a set of time-frequency resources based on the phase difference estimate; and
    a receiver configurator that configures a geometry indicator receiver, when a magnitude of the phase difference estimate is greater than a first threshold, to receive a geometry indicator signal transmission that uses resources from the set of time-frequency resources.

12. The device of claim 11, wherein:
    the first signal comprises a primary synchronization signal (PSS) having a first nominal power level, and
    the second signal comprises a secondary synchronization signal (SSS) having a second nominal power level.

13. The device of claim 12, wherein the PSS and SSS use time-frequency resources that are different from the set of time-frequency resources.

14. The device of claim 13, wherein the set of time-frequency resources fit within the same orthogonal frequency domain multiplexing (OFDM) symbols as time-frequency resources used by the PSS and SSS.

15. The device of claim 11, further comprising:
    a report transmitter that transmits to the macrocell base station, when a geometry indicator signal is successful received in the set of time-frequency resources, a report comprising an identity of a transmission node that transmitted the geometry indicator signal.

16. The device of claim 15, wherein:
    the transmission node includes the micro cell node.

17. The device of claim 11, wherein:
    a nominal transmission power of the geometry indicator signal is less than nominal transmission powers of the PSS and the SSS.

18. The device of claim 11, wherein the resource determiner comprises a checker that checks whether the phase difference estimate is within a second threshold of 180 degrees.

19. The device of claim 11, wherein the resource determiner comprises a lookup determiner that associates, from a list of phase difference values, a candidate phase difference value that is closest to the phase difference estimate.

20. The device of claim 11, wherein the receiver configurator further,
    powers down the geometry indicator receiver, when the magnitude of the phase difference estimate is equal to or less than the first threshold.

21. A non-transitory, processor-readable medium having processor-executable instructions stored thereon, the instructions, when executed, causing a processor to implement a wireless communications method, comprising:
    receiving a first synchronization signal from a first node;
    receiving a second synchronization signal from the first node;
    calculating a phase difference estimate between phases of the first synchronization signal and the second synchronization signal;
    determining a set of time-frequency resources based on the phase difference estimate; and
    configuring a geometry indicator receiver, when a magnitude of the phase difference estimate is greater than a first threshold, to receive a geometry indicator signal transmission that uses resources from the set of time-frequency resources.

22. A method of wireless communications, comprising:
    transmitting, from a first node, a first synchronization signal using a first set of transmission resources;
    transmitting, from the first node, a second synchronization signal using a second set of transmission resource, such that a phase difference between the first synchronization signal and the second synchronization signal is indicative of a third set of transmission resources for use by a second node for transmitting a geometry indicator signal;

wherein the third set of transmission resources occupy non-overlapping time-frequency resource elements in a same time slot as the first set of transmission resources or the second set of transmission resources.

23. The method of claim 22, wherein the phase difference can only be equal to one of a pre-determined set of values.

24. The method of claim 22, wherein the geometry indicator signal includes information uniquely identifying the second node.

25. A wireless communications apparatus, comprising:
a first synchronization signal transmitter that transmits a first synchronization signal using a first set of transmission resources;
a second synchronization signal transmitter that transmits a second synchronization signal using a second set of transmission resource, such that a phase difference between the first synchronization signal and the second synchronization signal is indicative of a third set of transmission resources for use by a transmission node for transmitting a geometry indicator signal;
wherein the third set of transmission resources occupy non-overlapping time-frequency resource elements in a same time slot as the first set of transmission resources or the second set of transmission resources.

26. The apparatus of claim 25, wherein the phase difference can only be equal to one of a pre-determined set of values.

27. The apparatus of claim 25, wherein the geometry indicator signal includes information uniquely identifying the second node.

28. A wireless communication network, comprising:
a macrocell base station that transmits a primary synchronization signal (PSS) and a secondary synchronization signal (SSS) such that a phase difference between the PSS and the SSS is indicative of location of resource elements used by a geometry indicator in a time-frequency resource plane;
a microcell base station configured to:
refrain from transmitting PSS and SSS; and
transmit the geometry indicator using the resource elements indicated by the macrocell base station; and
a mobile station configured to:
receive the PSS and the SSS;
locate and successfully receive the geometry indicator using the location information indicated by the phase difference; and
report an identity of the microcell base station to the macrocell base station.

29. The wireless communication network of claim 28, wherein the PSS and the SSS use time-frequency resources that are different from the set of time-frequency resources.

30. The wireless communication network of claim 28, wherein the PSS and the SSS use time-frequency resources use the set of time-frequency resources.

* * * * *